No. 876,623. PATENTED JAN. 14, 1908.
G. F. CONNER.
GUIDE FOR ROW CULTIVATING AND ROOT HARVESTING MACHINES.
APPLICATION FILED MAR. 27, 1906.
Fig. 1
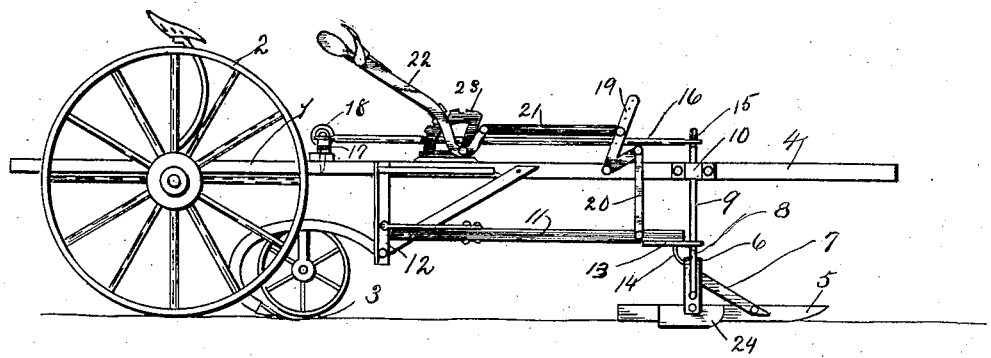
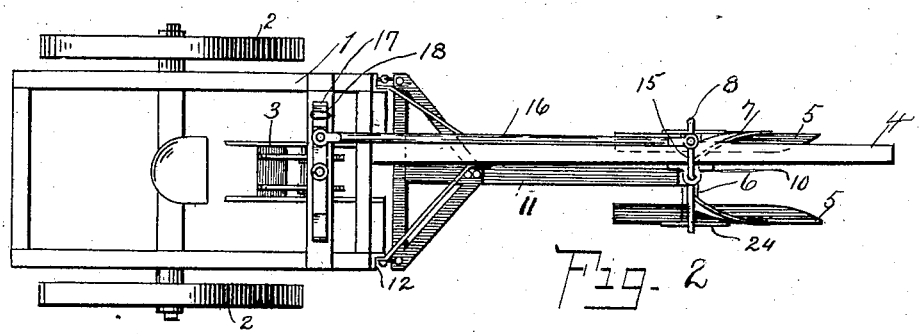
Fig. 2
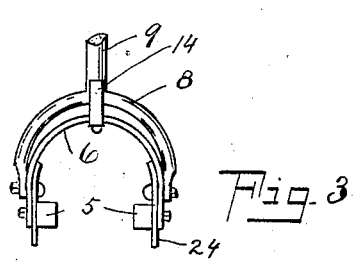
Fig. 3
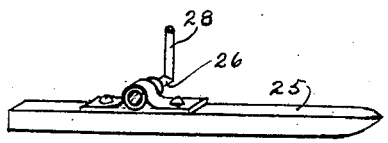
Fig. 4
Witnesses:
E. L. Moore
H. Scott
Inventor:
George F. Conner
by Clement R. Stickney.
Attorney.

UNITED STATES PATENT OFFICE.

GEORGE F. CONNER, OF PORT HURON, MICHIGAN.

GUIDE FOR ROW CULTIVATING AND ROOT HARVESTING MACHINES.

No. 876,623.   Specification of Letters Patent.   Patented Jan. 14, 1908.

Application filed March 27, 1906. Serial No. 308,273.

*To all whom it may concern:*

Be it known that I, GEORGE F. CONNER, a citizen of the United States of America, and a resident of the city of Port Huron, county of St. Clair, and State of Michigan, have invented certain new and useful Improvements in Guides for Row Cultivating and Root Harvesting Machines, of which the following is a full, clear, and exact specification.

In machines for cultivating or pulling or topping vegetables, such as potato diggers, beet harvesters and the like, especially of the type wherein the frame is rigid with the pole to which the draft rigging and team are attached, and either slides along the ground or is supported by a pair of bearing-wheels, it is difficult to maintain the root-operating members, such as pullers or topping knives, in proper relation to the row, owing to the sidewise movements of the frame from the swaying of the pole between the team, or through unequal draft or inequalities of the ground.

This invention relates to means for holding the frame and consequently the operating members in proper relation to the row, without regard to the draft mechanism, and sidewise movements of the team.

The invention consists in the matters hereinafter set forth, and more particularly pointed out in the appended claims.

In the drawings, Figure 1 is a view in side elevation of a beet topper provided with a guide embodying the features of the invention. Fig. 2 is a plan view of the topper and guide with the lifting and adjusting levers omitted. Fig. 3 is a view in detail of a pilot yoke. Fig. 4 is a view in detail of a modified form of pilot.

Referring to the drawings, 1 is the main frame of a root working machine, as, for instance, a beet topper, carried by a pair of bearing wheels 2, and provided with a beet topper 3, which is adapted to shear off the tops of beets as the machine is drawn along astride of the row. A pole 4 for the attachment of draft rigging and a team, is rigidly secured to the forward end of the machine.

The guide or pilot comprises a pair of parallel or slightly divergent runners or shoes 5 whose inner or proximate faces are outwardly curved at the forward ends of the shoes, and which are secured to each other by a downturned arch 6 of suitable design, whose extremities are bolted or riveted or otherwise rigidly connected to the shoes at about their center, braces 7 or other suitable means strengthening the construction. Said arch 6 is pivoted between the downturned ends of a vertically disposed yoke 8 having a central vertical stem 9 which has sliding, rotatable engagement with a bearing plate 10 or other like connection on the pole 4. A brace 11 of suitable design and material is secured at its rear end by a pivotal connection to a hanger or brace 12 of the main frame, beneath and in line with the pole, and its forward end is fitted with a bearing plate 13 or has other suitable sliding and rotatable engagement with the lower part of the yoke stem 9. An upwardly turned arm 14 of proper design, is secured to the upper part of the arch 6 so as to bear against the under side of the brace 11 and prevent the dipping of the forward points of the shoes or runners 5. Any construction which acts after the manner of a fifth-wheel may be used for this purpose instead of the brace or arm 14.

The upper end of the yoke stem 9 is provided with a laterally offset crank arm 15 which is linked by a horizontal member 16 with a foot lever 17 which is pivoted on the machine frame within reach of the operator. Said foot lever is normally locked rigidly with the frame, with the runners 5 parallel to the pole, by suitable means, as by a pin 18 but may be moved to swerve the machine as desired.

A vertical bell-crank lever 19 is secured on the pole by suitable means, and the lower arm is linked by a rod 20 to the forward part of the brace 11. The other arm is linked by a horizontally disposed rod 21 to a hand lever 22 pivoted on and interlocking with a quadrant 23, within reach of the operator so that the pilot may be raised from the ground, or may be made to carry the weight of the pole and forward part of the frame. Where the pilot is to be used on hard ground, as in irrigated lands where the earth becomes baked, the runners are preferably provided with centrally located, short blades 24 adapted to cut into the ground and prevent side slipping of the pilot when turned by the foot lever.

Where it is preferred, a single runner 25 may be used, which is horizontally pivoted to the horizontal arm 26 of a vertical stem 28, otherwise connected with the machine in the same manner as the yoke stem. Inasmuch as the runner is at one side of the center of rotation of the stem, the runner tends to bear off to one side, and so, if placed on the proper side of the beet row, will bear against it and so guide the machine.

In operation, the machine is driven onto the row with the pilot astride of the row, and as the runners are of sufficient length to span two or more hills, and their forward ends are outwardly curved on their inner faces, the pilot slides along the succession of hills, tops, etc., which constitute the row, following its lateral irregularities and swaying the machine into line behind it so that the topper or other operating member is brought into alinement with the row behind the runners. In machines of the sulky or two-wheeled type, or where the pole is free to swing between the team, the weight of the pole or the forward part of the machine may be transferred by means of the vertical adjusting lever to the pilot, so that the neck-yoke straps are relieved and hang loose, thereby preventing the sidewise movements of the team from disturbing the pilot.

The connection of the pilot near the yoke with the brace running back to the frame proper, relieves the pole of any torsional strain, while permitting free vertical adjustment of the runners.

I claim as my invention:—

1. A pilot for the purposes specified comprising a frame a horizontally disposed member pivoted at its rear end to the frame, a member adapted to bear against and slide along a row, pivotally secured to the forward end of the horizontally disposed member, having vertically movable engagement with the frame, means for raising the frame in relation to the row-following member, and means for swinging the row-following member, detachably interlocked with the frame.

2. The combination with the frame of a root-working machine of a pilot comprising a brace pivoted at its rear end to the frame, a vertically disposed yoke pivoted to the forward end of the brace and to the main frame, and vertically movable in the frame, a row-following member tiltable between the arms of the yoke, and a lever for raising the frame relative to the pilot, adjustably mounted on the frame.

3. The combination with the frame of a root-working machine of a pilot comprising a brace horizontally disposed beneath the frame, and pivotally secured thereto at its rear end, a downturned yoke having a vertical stem pivotally secured to the forward end of the brace, and slidably and rotatably secured to the frame, a row-following slide tiltable between the arms of the yoke, a horizontal crank arm on the stem linked to an operating lever on the frame, and a lifting lever adjustably secured on the frame, operatively connected with the brace.

4. The combination with the frame of a root-working machine supported by a pair of traction wheels, of a row-following pilot vertically adjustable in the forward portion of the frame, connected to the rear portion of the frame by a brace pivoted at one end to the pilot and at the other end to the rear portion of the frame, said pilot being pivoted to turn horizontally, and adjusting levers adapted to secure the pilot and frame.

5. The combination with the main frame of a root-working machine, whose rear portion is supported by a pair of traction-bearing wheels, of a pilot comprising a row-following member carrying the forward part of the frame, vertically adjustable therein, secured to the rear portion of the frame, by a brace pivoted at its forward end to the row-following member and at its rear end to the frame.

In testimony whereof, I have hereunto signed my name in the presence of the subscribing witnesses.

GEORGE F. CONNER.

Witnesses:
H. SCOTT,
C. R. STICKNEY.